3,220,814
METHOD OF TREATING QUARTZ FOR OPTICAL USE

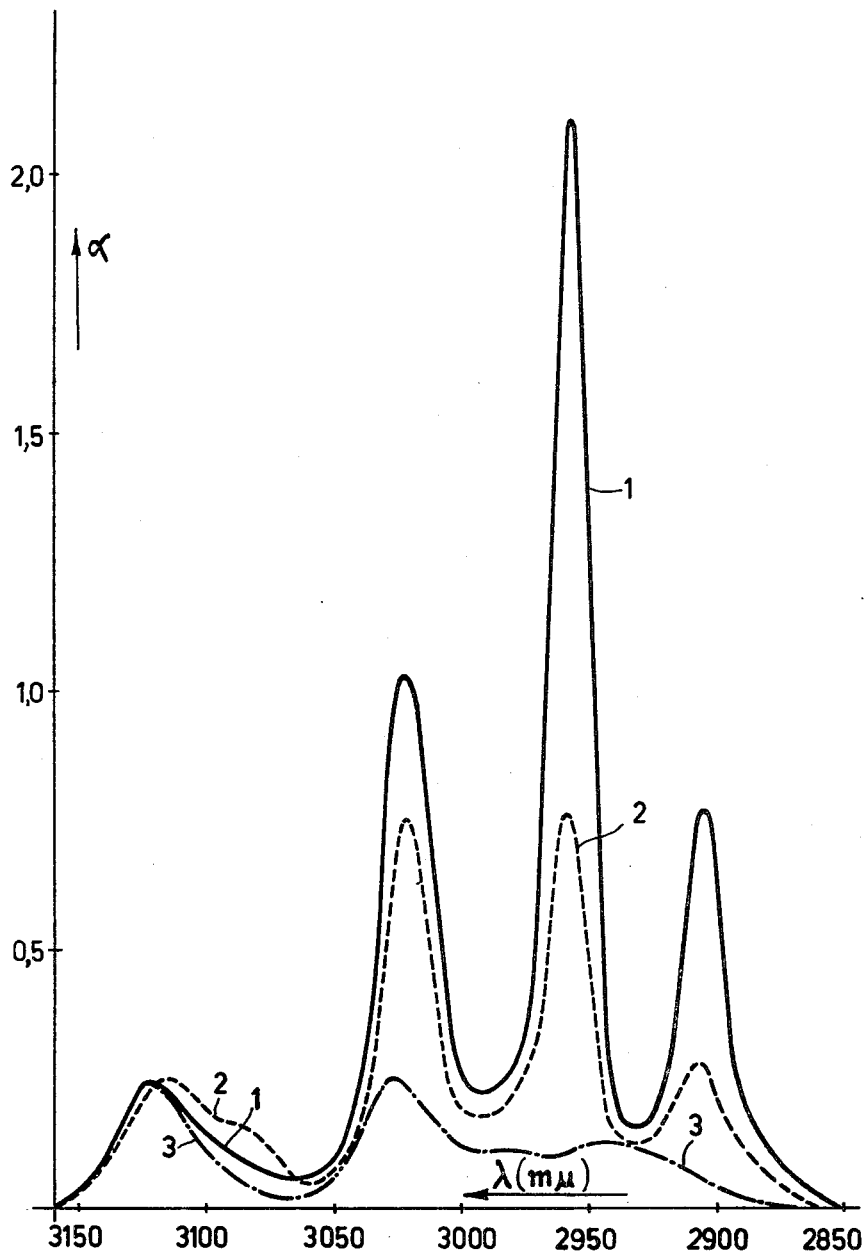

Ijsbrand Haven and Adriaan Kats, Emmasingel, Eindhoven, Netherlands, assignors to North American Philips Company, Inc., New York, N.Y., a corporation of Delaware
Filed Apr. 14, 1961, Ser. No. 103,159
Claims priority, application Netherlands, June 9, 1960, 252,468
3 Claims. (Cl. 65—32)

The invention relates to a method for treating quartz objects, in particular quartz crystals, for optical uses.

Quartz, both in natural crystalline form and in the form of quartz glass, exhibits absorptions in the infrared in the wavelength range between about 2.6 and 3.5$\mu$, which absorptions are due to impurities in the quartz. These absorptions bring about a loss of light which may vary in accordance with the impurity concentrations between 15 and 85% per mm. thickness, which corresponds to an absorption coefficient $\alpha$ between 0.8 and 18.3. The absorption coefficient is defined by the formula $$\alpha = \frac{1}{d} \ln \frac{100-2R}{T}$$

in which $d$ designates the thickness in cms., R the reflection and T the transmission. This absorption may be objectionable when quartz is used for optical purposes. For example, prisms manufactured from such quartz crystals are not suitable for use in spectroscopic apparatus for measurements in the near infrared, since it is not possible to carry out with these prisms measurements which are sufficiently accurate and reliable. The absorption is also undesirable if the quartz should be used as window material pervious to the infrared.

Experiments on which the invention is based have shown that the said troublesome absorptions are caused by the presence of protons which are bound to oxygen ions in the crystal lattice and perform vibrations with a frequency spectrum corresponding with the said wavelength range.

A method for treating quartz glass is known by which troublesome absorptions in the ultraviolet at about 2450 A. are reduced. For this purpose, the quartz glass is exposed to a direct-current field of about 1000 v./cm. at a temperature of 1000° C. for 30 hours. In this case, the starting material should be quartz glass which at about 2.75$\mu$ does not exhibit troublesome absorptions in the infrared and moreover, the treatment should be effected in the absence of water or water vapour, since otherwise the said absorptions in the infrared are introduced. When starting from a quartz glass which does exhibit these absorptions, they are left unchanged by this known method.

According to the invention, quartz objects for optical uses, in particular quartz crystals, for obtaining reduced absorptions in the infrared up to about 3½$\mu$ are treated by heating the objects at a temperature exceeding 900° C. in a carbonmonoxide-containing atmosphere.

It has been found that the action of the carbonmonoxide in this method is substantially independent of the pressure.

The treatment of quartz glass in accordance with the invention should take place at a temperature exceeding that of crystalline quartz. The latter should be heated at a temperature of at least 900° C., whereas the quartz glass should be treated above 1000° C. This is due to the irregular structure of the quartz glass, whereas the crystalline quartz is built up from a lattice in which channels of atomic dimensions occur at regular distances. Heating at a temperature exceeding 1200° C. should be prevented, since otherwise the quartz glass strongly tends to crystallization and it is difficult to keep the crystalline quartz intact as a result of modification transitions.

For a quartz crystal having a thickness of 1 cm., when heated at a temperature of 1000° C. a time of 240 hours is required for the elimination of the troublesome absorptions.

An elegant embodiment of the method in accordance with the invention is that in which the quartz objects are heated in an oxygen-containing atmosphere in a closed vessel, for example a vessel which is filled with air under atmospheric pressure and in which at the same time a quantity of carbon powder is present.

If desired, the quartz objects may be embedded in the carbon powder. In this event, the carbon powder reacts upon heating with the oxygen to form carbonmonoxide. A sufficient excess of carbon should be present, since otherwise carbon dioxide is formed which is not active.

The invention will now be described more fully with reference to the graph of the accompanying drawing.

In this graph, the course of the absorption coefficient ($\alpha$) per cm. thickness of the crystal as a function of the wave length ($\lambda$) in the range of from 2.85 to 3.2$\mu$ is indicated.

The curve 1 represents this course of a quartz crystal having a thickness of 2.85 mm.

Curve 2 shows the result of a treatment of the same crystal for 38 hours at a temperature of 1000° C. in a carbonmonoxide atmosphere, from which it appears that the absorptions are already considerably reduced.

Curve 3 represents the absorption as a function of the wave length of the same crystal, which is heated for 70 hours at a temperature of 1000° C. in a carbonmonoxide atmosphere and which causes an even further reduction of the absorptions. The remaining absorptions cannot be reduced further by a continued treatment in accordance with the invention. The curves have been measured at the temperature of liquid nitrogen (−195° C.), since at such a low temperature the absorption spectrum is reproduced with a finer structure than at room temperature.

What is claimed is:
1. A method of treating quartz to reduce absorptions of infra-red radiation up to 3½$\mu$ comprising heating the quartz between about 900° C. and 1200° C. in an atmosphere containing carbon monoxide for about 24 hours for each millimeter of thickness.
2. A method of treating quartz to reduce absorptions of infra-red radiation up to 3½$\mu$ comprising the steps of embedding the quartz in carbon powder and heating the embedded quartz to a temperature between about 900° C. and 1200° C. in an atmosphere containing a quantity of oxygen sufficient to form carbon monoxide for about 24 hours for each millimeter of thickness.
3. A method of treating quartz to reduce absorptions of infra-red radiation up to 3½$\mu$ comprising heating the quartz at a temperature of about 1000° C. for about 240 hours in an atmosphere containing carbon monoxide.

References Cited by the Examiner
UNITED STATES PATENTS

| | | | |
|---|---|---|---|
| 2,612,726 | 10/1952 | Nordberg | 65—32 |
| 2,897,126 | 7/1959 | George | 204—130 |

DONALL H. SYLVESTER, *Primary Examiner.*